United States Patent [19]

Beck

[11] Patent Number: 4,459,630
[45] Date of Patent: Jul. 10, 1984

[54] EXCESS CURRENT PROTECTION CIRCUIT FOR A POWER SUPPLY

[75] Inventor: Francis J. Beck, Churchville, Pa.

[73] Assignee: Honeywell, Inc., Minneapolis, Minn.

[21] Appl. No.: 412,404

[22] Filed: Aug. 27, 1982

[51] Int. Cl.³ .............................................. H02H 3/08
[52] U.S. Cl. ........................................ 361/18; 361/101
[58] Field of Search .................... 361/18, 92, 93, 100, 361/101; 323/271, 275, 276, 901; 363/22, 23, 49, 50

[56] References Cited

U.S. PATENT DOCUMENTS

| | | |
|---|---|---|
| 3,106,674 | 10/1963 | Hamilton . |
| 3,204,175 | 9/1961 | Kuriger . |
| 3,319,150 | 5/1967 | Elich et al. ................. 323/276 X |
| 3,377,540 | 4/1968 | Meyer ............................. 363/22 X |
| 3,391,330 | 10/1965 | Grossoehme . |
| 3,493,878 | 2/1967 | Fautale . |
| 3,541,425 | 6/1968 | Weidmann . |
| 3,546,566 | 11/1968 | Marzolf . |
| 3,886,410 | 5/1975 | Seer, Jr. ............................. 361/18 |

OTHER PUBLICATIONS

"Regulator with Shut Down at Short Circuit", Ser, Electronic Engineering, Oct. 1978, vol. 50, No. 613.

Primary Examiner—Harry E. Moose, Jr.
Attorney, Agent, or Firm—Mitchell J. Halista; Trevor B. Joike

[57] ABSTRACT

A power supply having a protection circuit for interrupting the current flow from the power supply upon the occurrence of an excessive current drain from the output of the power supply and for automatically restoring the power supply output upon a termination of the excessive current drain and a subsequent recycling of the power supply input. In a specific embodiment, the protection circuit interrupts the output of a direct current (D.C.) to direct current (D.C.) inverter to protect the oscillator and other circuit components from a current overload produced by an excessive current drain which produces a drop in the output voltage. A transistor in series with the output current is maintained in a conducting state by a control transistor supplying base current thereto. The control transistor is turned off by a drop in the output voltage while a start-up capacitor provides a current path to the base of the control transistor to restart the power supply output upon by a recycling of the input to the power supply.

9 Claims, 1 Drawing Figure

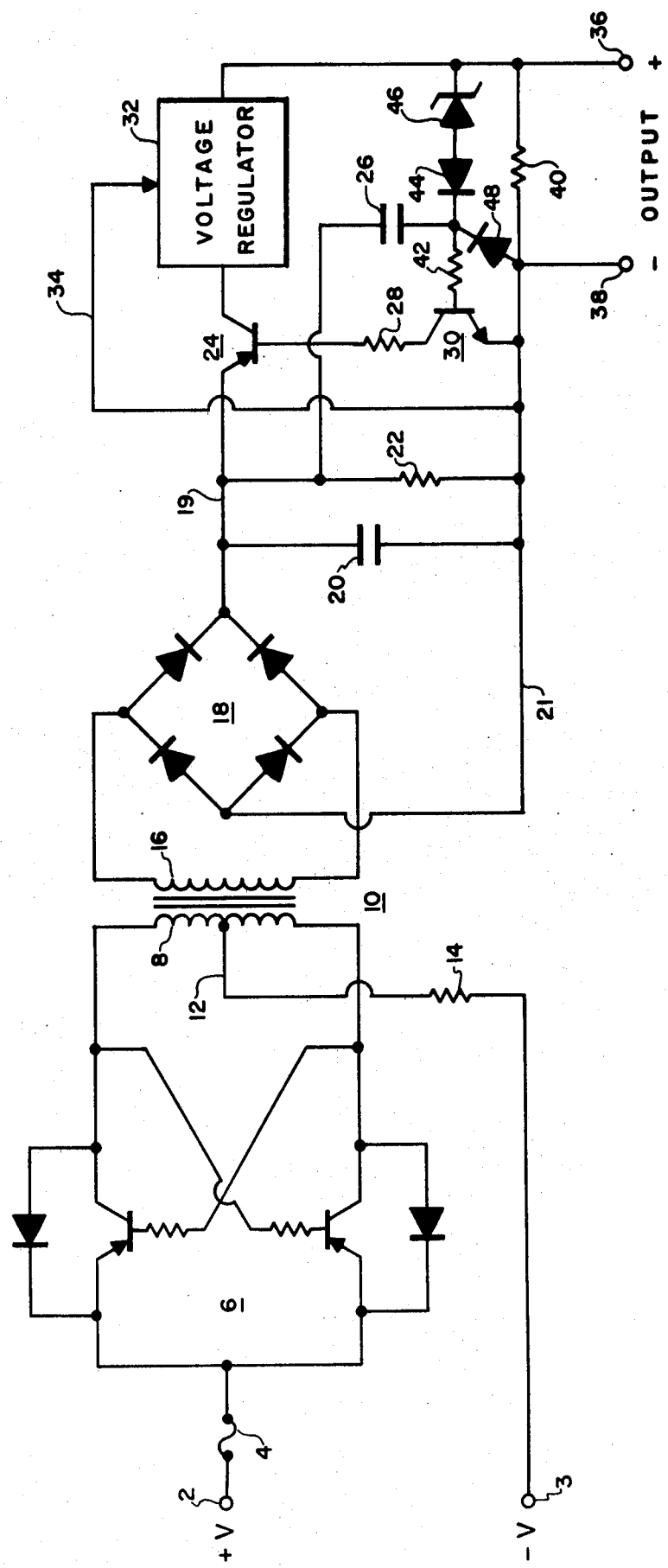

EXCESS CURRENT PROTECTION CIRCUIT FOR A POWER SUPPLY

BACKGROUND OF THE INVENTION

Field of the Invention

The present invention relates to power supplies. More specifically, the present invention is directed to a power supply having an excessive current drain protection.

SUMMARY OF THE INVENTION

An object of the present invention is to provide an improved power supply having an excessive current drain protection.

In accomplishing this and other objects, there has been provided, in accordance with the present invention a power supply having an excessive current drain protection for interrupting the output of the power supply upon the detection of an excessive current drain from the output of the power supply and for automatically restoring the output upon the termination of the excessive current drain and a recycling of an input to the power supply. The power supply includes a source of input voltage to said power supply, a voltage regulator, a series transistor having its emitter-collector path connected in series between said source and said regulator, a control transistor having its emitter-collector path connected between a base of said series transistor and a ground connection of said source and said regulator, threshold voltage means connected between a base of said control transistor and an output of said voltage regulator to provide a current path to said base of said control transistor when said output of said voltage regulator exceeds said threshold voltage and restart means connected to said base of said control transistor to introduce a current flow into said base following a loss of said threshold level resulting in an interruption of current flow through said control transistor and said series transistor.

BRIEF DESCRIPTION OF THE DRAWINGS

A better understanding of the present invention may be had when the following detailed description is read in connection with the accompanying drawing, in which the single FIGURE is a schematic illustration of a power supply incorporating an embodiment of an example of the present invention.

DESCRIPTION OF THE PREFERRED EMBODIMENT

Detailed Description

Referring to the single FIGURE drawing in more detail, there is shown a power supply incorporating an example of the present invention in a D.C. to D.C. supply in which an input D.C. voltage is converted to a different D.C. voltage while being regulated at the second voltage. Thus, a pair of input terminals 2, 3 are connected to a source of an input D.C. voltage and current. Specifically, a first input terminal 2 is connected to the positive or + voltage side of the D.C. input, and a second input terminal 3 is connected to the negative or − voltage side of the D.C. input. The first input terminal 2 is connected through a fuse 4 to the input of a conventional inverter oscillator circuit 6 connected across a primary 8 of a transformer 10. A center tap 12 on the primary 8 is connected through a resistor 14 to the negative input terminal 3.

A secondary winding 16 of the transformer 10 is connected to a pair of diagonally opposite terminals on a conventional diode rectifier bridge circuit 18. A second pair of diagonally opposite terminals on the bridge circuit 18 are connected to respective ones of a pair of output lines 19 and 21 and across a filter capacitor 20. The lines 19 and 21 are the positive and negative voltage output lines from the bridge circuit 18, respectively. A resistor 22 is connected between output lines 19, 21, i.e., across the filter capacitor 20. The output line 19 is connected to an emitter terminal of a PNP series control transistor 24 and to one side of a start-up capacitor 26. The base electrode of the series transistor 24 is connected through a resistor 28 to the collector of an NPN control transistor 30. The emitter of the control transistor 30 is connected to output negative line 21. The collector of the series transistor 24 is connected to the input of a conventional voltage regulator 32. The voltage regulator 32 has a common terminal connected by line 34 to the negative output line 21. The output of the voltage regulator 32 is connected to an output terminal 36 which is used as a positive D.C. output terminal. The emitter of the control transistor 30 is connected to a second output terminal 38 used as a negative D.C. output terminal. A fixed load resistor 40 is connected across the positive and negative output terminals 36, 38. The base of the control transistor 30 is connected through a resistor 42 to the outer side of the start-up capacitor 26 and through a diode 44 connected back-to-back with the anode of a Zener diode 46. The cathode side of the Zener diode 46 is connected to the positive output 36. A discharge diode 48 is connected between the junction of the diode 44 and the capacitor 26 and the output line 21.

MODE OF OPERATION

The short circuit protection circuit embodied in the illustrated power supply acts to protect the power supply from a catastrophic component failure when a short circuit or other abnormal load is applied across the output terminals 36, 38 causing an excessive current drain and a drop in the output voltage. When the abnormal load is removed from across the output terminals 36, 38 a recycling of the input power applied to the input terminals 2, 3, i.e., turning the input power off and on is effective to return the power supply circuit to normal operation. Thus, the fuse 4, the resistor 14 as well as the transistors found in the inverter circuit 6 are protected from damage by the protection circuit of the present invention and any other circuits supplied through the fuse 4 are maintained in an operational state. Specifically, the protection circuit acts to disconnect the voltage regulator 32 from the voltage regulator 32 from the inverter circuit 6 which continues to oscillate when an excessive current drain is present at the output terminals 36, 38. Such an excessive current drain is manifested by a drop in the output voltage supplied by the voltage regulator 32 and appearing across the output terminals 36, 38.

The power supply circuit normally functions by converting the input D.C. voltage applied to the input terminals 2, 3 into an alternating current (A.C.) voltage which is applied to the transformer 10. The transformer 10 has a fixed winding ratio between the primary winding 8 and the secondary winding 16 whereby a corresponding A.C. voltage appears across the secondary winding 16. This A.C. voltage is rectified by the rectifier bridge 18 to a D.C. voltage and current which is filtered by the filter capacitor 20. The series transistor 24 completes an input circuit to the voltage regulator 32 by maintaining a current flow into the voltage regulator 32. The conducting state of the transistor 24 is effected by the control transistor 30 which supplies base current through resistor 28 into the base electrode of the series transistor 24. A current flow into the base electrode of the control transistor 30 is, in turn, controlled by the output voltage appearing across the output resistor 40, i.e., across the output terminals 36, 38. This output voltage is used to drive base current for the control transistor 30 through the Zener diode 46, the diode 44 and the resistor 42.

If this output voltage drops below the voltage necessary to maintain the control transistor 30 in a current conducting state, the control transistor 30 is placed in a non-conducting state which, in turn, is effective to turn-off the series transistor 24. The Zener diode 46 permits the circuit to afford protection for loads that cause the output voltage of the regulator 32 to fall below its normal level. The Zener diode 46 should be selected so that its voltage drop in combination with the drop of the diode 44, the resistor 42 and the base to emitter junction of the control transistor 30 is just below the normal output voltage of the regulator 32. This arrangement provides the necessary protection operation wherein as soon as the output voltage of the regulator 32 drops below the voltage drop of the aforesaid Zener diode branch circuit as a result of an excessive output current drain, the base current of the transistor 30 is interrupted, which as discussed previously, is effective to cutoff the current conducting state of the series transistor 24 to disconnect the regulator 32 from the inverter 6. This arrangement permits the protection circuit to respond to excessive current drains or loads that pull down the output voltage on output terminals 36, 38 below a normal output voltage level but which are less than a short circuit state represented by an approximately zero output voltage condition. The output of the regulator 32 will fall when the output of the inverter 6 drops below the input voltage necessary for the regulator 32 to sustain its output voltage. Thus, the protection circuit acts as a switch, not as a regulator, and does not dissipate power as would be the case of a regulator circuit.

When the short circuit is removed from the output terminals 36, 38 and the input D.C. power applied to the input terminals 2, 3 is cycled off and on, the start-up capacitor 26 which was previously charged the high voltage at the output of the bridge circuit 18, is discharged. This discharge operation uses the resistor 22 across the filter capacitor 20 and the diode 48 to provide a discharge path for the capacitor 26. After the capacitor 26 is discharged during cycling of the input power, the power supply circuit is restored to an operating state by a restoration of the conducting state of the control transistor 30 and the series transistor 24. Specifically, restoring the input power to input terminals 2, 3 enables the discharged start-up capacitor 26 to introduce a current flow into the base of the control transistor 30 as the capacitor 26 starts to recharge. This current flow restores the current conducting state of the control transistor 30 which, in turn, restores the current flow into the base of the series transistor 24. The current flow into the base of the series transistor 24 reinstates its current conducting state to reapply the output of the bridge 18 to the input of the regulator 32. The output of the regulator 32 is now restored which enables a current flow to the base of the transistor 30 to be reestablished through the Zener diode 46, the diode 44 and the resistor 42. Thus, the power supply is restored to its normal operating state while the protection circuit is again available for the next excessive current occurrence.

Accordingly, it may be seen that there has been provided, in accordance with the present invention, an improved protection circuit for providing excessive current drain protection for a power supply.

The embodiments of the invention in which an exclusive property or privilege is claimed are defined as follows:

1. A power supply protection circuit comprising
   a voltage source,
   a voltage regulator,
   a series transistor having its emitter-collector path connected in series between said source and said regulator,
   a control transistor having its emitter-collector path connected between a base of said series transistor and a common connection of said source and said regulator,
   threshold voltage means connected between a base of said control transistor and an output of said voltage regulator to provide a current path to said base of said control transistor to turn on said control transistor and said series transistor when an output voltage of said voltage regulator exceeds said threshold voltage and to turn off said control transistor and said series transistor by interrupting said current path when said output voltage of said voltage regulator decreases below said threshold level and
   restart means connected to said base of said control transistor to introduce a current flow into said base of said control transistor following a loss of said output voltage of said voltage regulator resulting in an interruption of current flow through said control transistor and said series transistor.

2. A protection circuit as set forth in claim 1 wherein said threshold voltage means includes a Zener diode.

3. A protection circuit as set forth in claim 1 wherein said restart means includes a capacitor connected between said voltage source and said base of said control transistor.

4. A protection circuit as set forth in claim 3 wherein said restart means also includes a diode and a resistor connected in series across said capacitor with said diode being poled to allow a discharge of said capacitor when said voltage source is turned off.

5. A protection circuit as set forth in claim 4 wherein said threshold means includes a Zener diode.

6. A protection circuit as set forth in claim 1 wherein said series transistor is a PNP transistor connected to a positive output of said voltage source and said control transistor is an NPN transistor having its emitter connected to a negative output of said voltage source.

7. A power supply protection circuit comprising
   a voltage source,
   a voltage regulator,
   a series transistor having its emitter-collector path connected in series between said source and said regulator,
   a control transistor having its emitter-collector path connected to the base of said series transistor,
   threshold voltage means connected to said control transistor and to an output of said voltage regulator to cause said control transistor to turn off said series transistor when an output voltage on said output of said voltage regulator decreases below said threshold voltage, said threshold voltage means including a zener diode, and restart means connected to said control transistor to restart said series transistor and said control transistor following a loss of said output voltage of said voltage regulator resulting in an interruption of current flow through said control transistor and said series transistor.

8. A protection circuit as set forth in claim 7 wherein said restart means includes a capacitor connected between said voltage source and a base of said control transistor.

9. A protection circuit as set forth in claim 8 wherein said restart means also includes a diode and a resistor connected in series across said capacitor with said diode being poled to allow a discharge of said capacitor when said voltage source is turned off.

* * * * *